(12) United States Patent
Banerjee (10) Patent No.: US 9,461,984 B1
(45) Date of Patent: Oct. 4, 2016

(54) SYSTEMS AND METHODS FOR BLOCKING FLANKING ATTACKS ON COMPUTING SYSTEMS

(71) Applicant: Symantec Corporation, Mountain View, CA (US)

(72) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/866,634

(22) Filed: Sep. 25, 2015

Related U.S. Application Data (63) Continuation of application No. 14/139,829, filed on Dec. 23, 2013, now Pat. No. 9,225,735.

(51) Int. Cl.
*H04L 29/06* (2006.01)

(52) U.S. Cl.
CPC ............. *H04L 63/08* (2013.01); *H04L 63/105* (2013.01); *H04L 63/1458* (2013.01); *H04L 63/20* (2013.01)

(58) Field of Classification Search
CPC ............................ H04L 63/20; H04L 63/1458
See application file for complete search history.

(56) References Cited

U.S. PATENT DOCUMENTS

| | | | | |
|---|---|---|---|---|
| 2002/0032854 A1* | 3/2002 | Chen | ................... | H04L 63/1408 713/151 |
| 2005/0060573 A1* | 3/2005 | D'Souza | ............. | H04L 63/1458 726/4 |
| 2005/0071650 A1* | 3/2005 | Jo | ........................... | G06F 21/55 713/188 |
| 2006/0248588 A1* | 11/2006 | Jayaraman | .......... | H04L 63/1458 726/22 |
| 2008/0028467 A1* | 1/2008 | Kommareddy | ..... | H04L 63/1458 726/23 |
| 2009/0216910 A1* | 8/2009 | Duchesneau | ......... | G06F 9/5072 709/250 |
| 2011/0196965 A1* | 8/2011 | Romero | .................... | H04L 9/12 709/225 |
| 2013/0139214 A1* | 5/2013 | Chesla | ................ | H04L 63/1441 726/1 |

OTHER PUBLICATIONS

Fanglu Guo, et al.; Systems and Methods for Reducing False Positives When Using Event-Correlation Graphs to Detect Attacks on Computing Systems; U.S. Appl. No. 14/031,044, filed Sep. 19, 2013.
Shead, Sam, "Symantec: Data-stealing hackers use DDoS to distract from attacks", http://www.zdnet.com/symantec-data-stealing-hackers-use-ddos-to-distract-from-attacks-7000005481/, as accessed Nov. 13, 2013, (Oct. 9, 2012).

* cited by examiner

*Primary Examiner* — Dao Ho
(74) *Attorney, Agent, or Firm* — ALG Intellectual Property, LLC (57) ABSTRACT

A computer-implemented method for blocking flanking attacks on computing systems may include (1) detecting a denial-of-service attack targeting a computing network, (2) inferring, based at least in part on detecting the denial-of-service attack, a secondary attack targeting at least one computing resource within the computing network, (3) determining that the computing resource is subject to additional protection based on inferring the secondary attack targeting the computing resource, and (4) protecting the computing resource against the secondary attack by adding an authentication requirement for accessing the computing resource. Various other methods, systems, and computer-readable media are also disclosed.

15 Claims, 7 Drawing Sheets

SYSTEMS AND METHODS FOR BLOCKING FLANKING ATTACKS ON COMPUTING SYSTEMS

CROSS REFERENCE TO RELATED APPLICATION

This application is a continuation of U.S. application Ser. No. 14/139,829, filed 23 Dec. 2013, the disclosure of which is incorporated, in its entirety, by this reference.

BACKGROUND

In recent years, malicious programmers have created a variety of sophisticated targeted attacks aimed at high-profile or high-level entities, such as governments, corporations, political organizations, defense contractors, or the like. In many cases, the goal of such targeted attacks is to gain access to highly sensitive or confidential information, such as financial information, defense-related information, and/or intellectual property (e.g., source code), and/or to simply disrupt an entity's operations.

Many such attacks involve sending emails to a targeted entity that contain an attachment that has been carefully crafted to take advantage of an as-yet-undiscovered vulnerability of a particular application (commonly known as a "zero-day" exploit). Because many security software companies attempt to combat malware by creating and deploying malware signatures (e.g., hash functions) that uniquely identify known malware, this type of targeted attack (commonly known as a "spear phishing" attack) is often difficult for traditional security software to detect and/or neutralize since the exploits in question have yet to be publicly discovered.

Because targeted attacks may be difficult for traditional security systems to automatically detect and remediate, the attention of system administrators can be vital to identifying and/or responding to a targeted attack. However, some attackers have begun to use decoy attacks, such as distributed denial-of-service attacks, to distract systems administrators while a targeted attack takes place, thereby increasing the likelihood that the targeted attack succeeds.

Accordingly, the instant disclosure identifies and addresses a need for additional and improved systems and methods for blocking flanking attacks on computing systems.

SUMMARY

As will be described in greater detail below, the instant disclosure generally relates to systems and methods for blocking flanking attacks on computing systems by responding to denial-of-service attacks on a network with temporarily increased authentication requirements for accessing sensitive network resources. In some examples, these systems and methods may quickly and automatically deploy the increased authentication requirements through modifying software-defined networks.

In one example, a computer-implemented method for blocking flanking attacks on computing systems may include (1) detecting a denial-of-service attack targeting a computing network, (2) inferring, based at least in part on detecting the denial-of-service attack, a secondary attack targeting at least one computing resource within the computing network, (3) determining that the computing resource is subject to additional protection based on inferring the secondary attack targeting the computing resource, and (4) protecting the computing resource against the secondary attack by adding an authentication requirement for accessing the computing resource.

In one embodiment, (1) the computing network includes a software-defined network and (2) adding the authentication requirement for accessing the computing resource includes modifying the software-defined network to interpose an authentication system that implements the authentication requirement between the computing resource and at least a portion of the computing network.

In one embodiment, (1) inferring the secondary attack targeting the computing resource may include determining that the computing resource is sensitive and (2) determining that the computing resource is subject to additional protection may be performed in response to determining that the computing resource is sensitive.

In some examples, determining that the computing resource is sensitive may include (1) identifying, by a data loss prevention system, a classification of data corresponding to the computing resource and (2) determining that the classification of data indicates that the data corresponding to the computing resource includes a sensitive type of data. In some examples, determining that the computing resource is sensitive may include (1) identifying a classification of the computing resource based on user activity in connection with the computing resource and (2) determining that the classification of the computing resource indicates that the computing resource includes a sensitive type of computing resource. In some examples, determining that the computing resource is sensitive may include determining that the computing resource has been tagged as sensitive.

In some examples, adding the authentication requirement for accessing the computing resource may include adding a second authentication factor to accompany a first authentication factor that is already in place for accessing the computing resource. In one embodiment, the computer-implemented method may further include (1) determining that the secondary attack is not targeting the computing resource, and (2) removing the authentication requirement in response to determining that the secondary attack is not targeting the computing resource.

In some examples, inferring the secondary attack based at least in part on detecting the denial-of-service attack may include inferring a spear phishing attack that attempts to collect an authentication factor used by at least one user of the computing network for accessing the computing resource.

In one embodiment, a system for implementing the above-described method may include (1) a detection module, stored in memory, that detects a denial-of-service attack targeting a computing network, (2) an inference module, stored in memory, that infers, based at least in part on detecting the denial-of-service attack, a secondary attack targeting at least one computing resource within the computing network, (3) a determination module, stored in memory, that determines that the computing resource is subject to additional protection based on inferring the secondary attack targeting the computing resource, (4) a protection module, stored in memory, that protects the computing resource against the secondary attack by adding an authentication requirement for accessing the computing resource, and (5) at least one processor configured to execute the detection module, the inference module, the determination module, and the protection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a denial-of-service attack targeting a computing network, (2) infer, based at least in part on detecting the denial-of-service attack, a secondary attack targeting at least one computing resource within the computing network, (3) determine that the computing resource is subject to additional protection based on inferring the secondary attack targeting the computing resource, and (4) protect the computing resource against the secondary attack by adding an authentication requirement for accessing the computing resource.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for blocking flanking attacks on computing systems. As will be explained in greater detail below, by responding to denial-of-service attacks on a network with temporarily increased authentication requirements for accessing sensitive network resources, the systems and methods described herein may prevent decoy denial-of-service attacks from increasing the likelihood of success of targeted attacks on the network. Additionally, by deploying the increased authentication requirements through modifying software-defined networks, these systems and methods may quickly and automatically protect against flanking attacks.

The following will provide, with reference to FIGS. 1, 2, 4, and 5, detailed descriptions of exemplary systems for blocking flanking attacks on computing systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
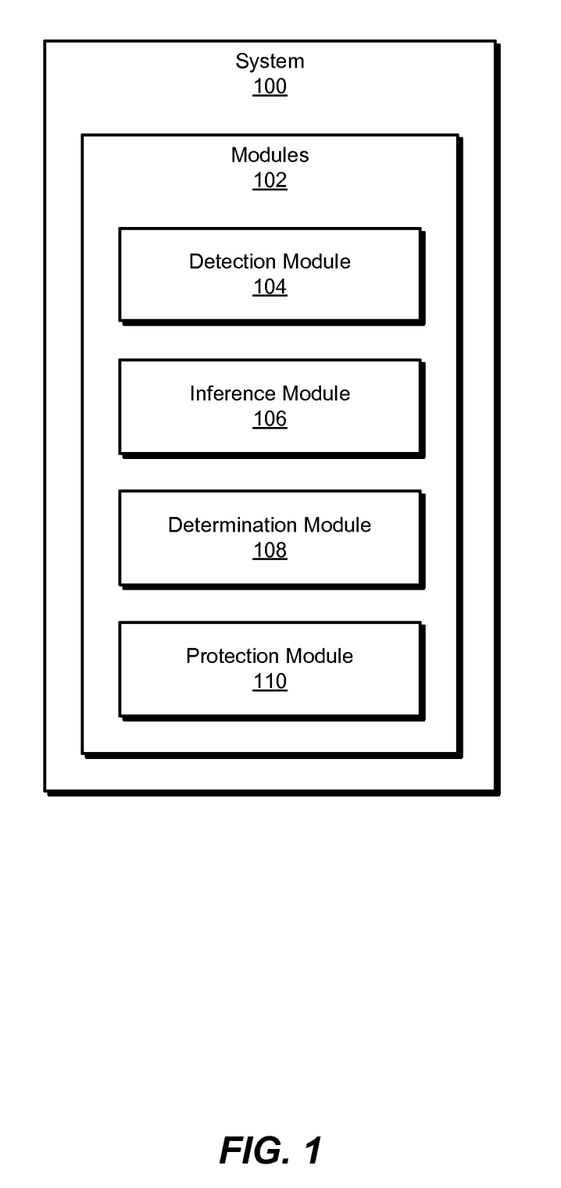
FIG. 1 is a block diagram of an exemplary system for blocking flanking attacks on computing systems.

FIG. 1 is a block diagram of an exemplary system 100 for blocking flanking attacks on computing systems. As illustrated in this figure, exemplary system 100 may include one or more modules 102 for performing one or more tasks. For example, and as will be explained in greater detail below, exemplary system 100 may include a detection module 104 that may detect a denial-of-service attack targeting a computing network. Exemplary system 100 may additionally include an inference module 106 that may infer, based at least in part on detecting the denial-of-service attack, a secondary attack targeting at least one computing resource within the computing network. Exemplary system 100 may also include a determination module 108 that may determine that the computing resource may be subject to additional protection based on inferring the secondary attack targeting the computing resource. Exemplary system 100 may additionally include a protection module 110 that may protect the computing resource against the secondary attack by adding an authentication requirement for accessing the computing resource. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, network 204, and/or computing resource 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
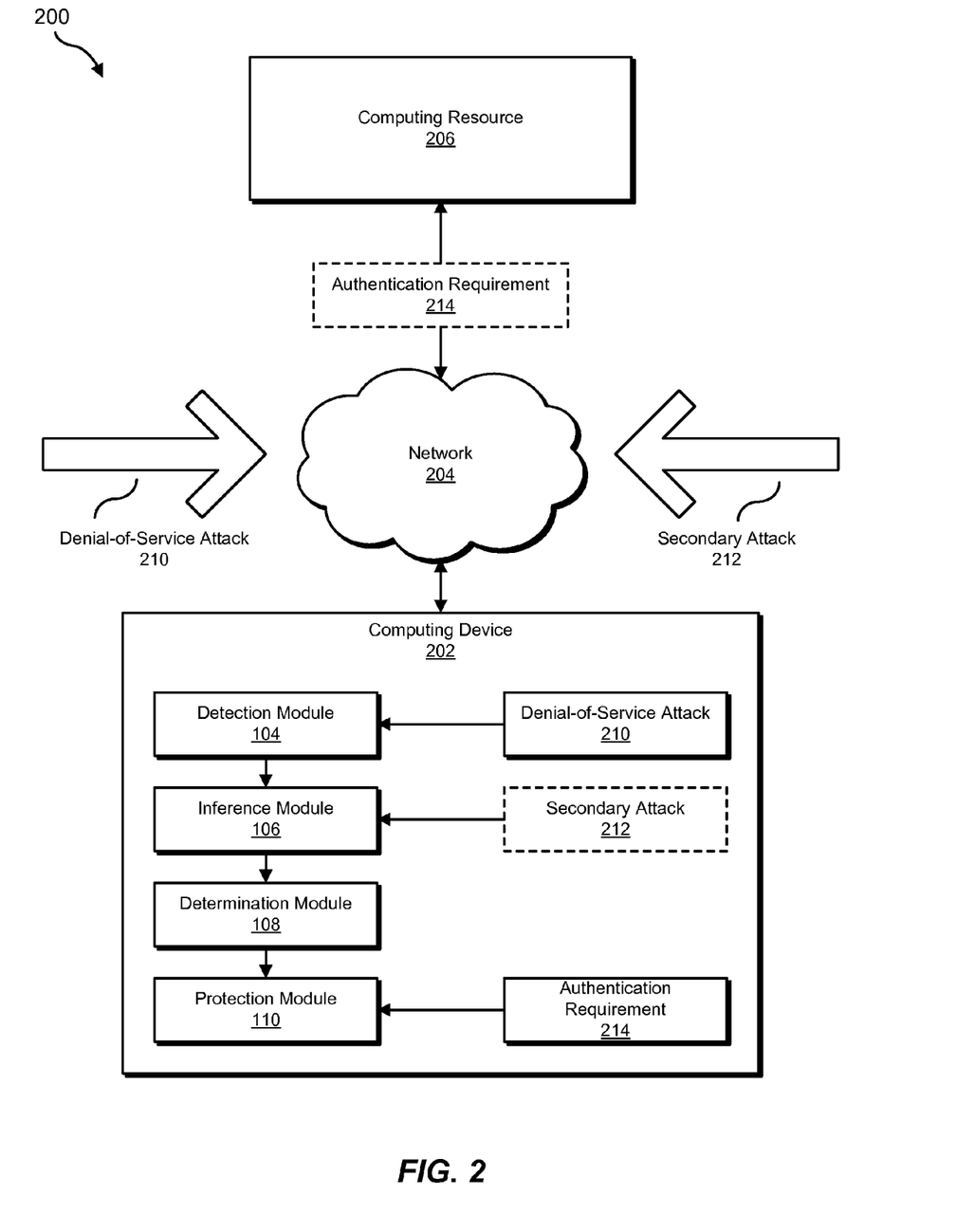
FIG. 2 is a block diagram of an additional exemplary system for blocking flanking attacks on computing systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing resource 206 via a network 204. Computing device 202 may be programmed with one or more of modules 102. Additionally or alternatively, computing resource 206 may be programmed with one or more of modules 102.

In one embodiment, one or more of modules 102 from FIG. 1 may, when executed by at least one processor of computing device 202 and/or computing resource 206, enable computing device 202 and/or computing resource 206 to blocking flanking attacks on computing systems. For example, and as will be described in greater detail below, one or more of modules 102 may cause computing device 202 and/or computing resource 206 to blocking flanking attacks on computing systems (e.g., to prevent a denial-ofservice attack 210 on network 204 to aid in the success of a secondary attack 212 that may attempt to compromise computing resource 206). For example, and as will be described in greater detail below, detection module 104 may be programmed to detect denial-of-service attack 210 targeting network 204. Inference module 106 may be programmed to infer, based at least in part on detecting denial-of-service attack 210, secondary attack 212 targeting at least one computing resource within computing network 204. Determination module 108 may be programmed to determine that the computing resource is subject to additional protection based on inferring secondary attack 212 targeting the computing resource. Protection module 110 may be programmed to protect the computing resource against secondary attack 212 by adding an authentication requirement 214 for accessing the computing resource.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In some examples, computing device 202 may represent a security server and/or a software defined network controller.

Computing resource 206 generally represents any type or form of computing device, computing service, and/or computer-readable data that may be accessed over a network. Examples of computing resource 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and computing resource 206. In some examples, network 204 may include an enterprise network. In some examples, network 204 may include software-defined network.

Figure 3:
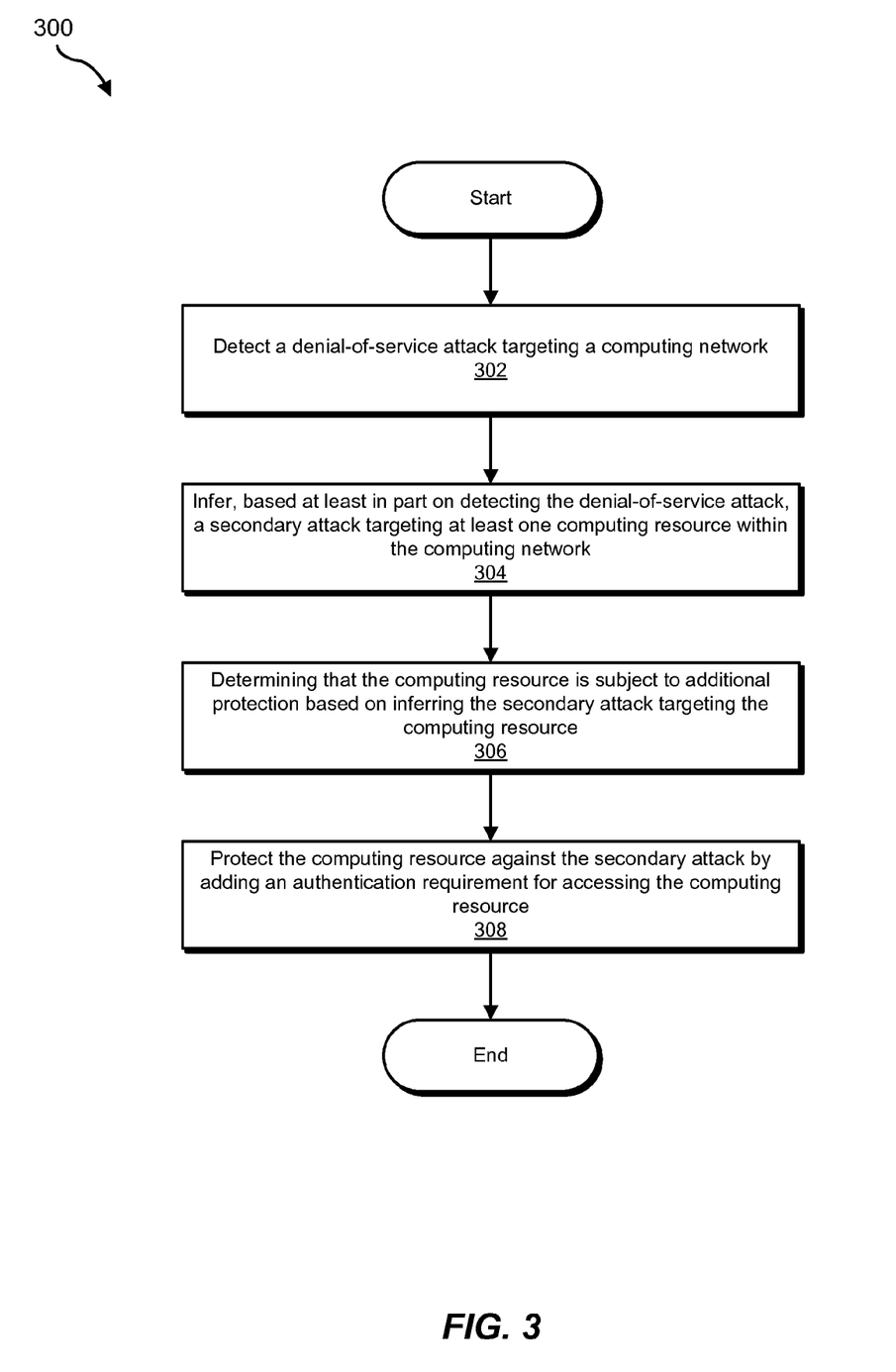
FIG. 3 is a flow diagram of an exemplary method for blocking flanking attacks on computing systems.

FIG. 3 is a flow diagram of an exemplary computer-implemented method 300 for blocking flanking attacks on computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, system 500 in FIG. 5, computing system 610 in FIG. 6, and/or portions of exemplary network architecture 700 in FIG. 7.

As illustrated in FIG. 3, at step 302 one or more of the systems described herein may detect a denial-of-service attack targeting a computing network. For example, at step 302 detection module 104 may, as part of computing device 202 in FIG. 2, detect denial-of-service attack 210 targeting computing network 204.

As used herein, the phrase "denial-of-service attack" may refer to any attack that undermines or threatens to undermine the availability and/or responsiveness of one or more computing resources within a computing network. For example, a denial-of-service attack may include flooding one or more computing resources within the computing network with requests in order to consume available bandwidth to the targeted resource, to reduce the number of available connections to the targeted resource, and/or to increase the workload placed on the targeted resource (e.g., thereby consuming processing power and/or available memory). In some examples, the denial-of-service attack may include a distributed denial-of-service attack. As used herein, the phrase "distributed denial-of-service attack" may refer to any denial-of-service attack launched from multiple systems in concert. For example, an attacker may control a botnet and direct the botnet to flood the computing network (or a portion of the computing network) with requests. In some examples, the denial-of-service attack may target the computing network so as to distract and/or occupy one or more security administrators and/or security system resources during a secondary attack.

The computing network may include any type of network that may include a sensitive computing resource and/or that may be subject to an attack. For example, the computing network may include an enterprise network. In some examples, the computing network may include a software-defined network. As used herein, the phrase "software-defined network" may refer to any network that may be dynamically configured by software. For example, the phrase "software-defined network" may refer to a network where the control plane (e.g., making control path decisions for the network) is decoupled from the data plane (e.g., forwarding packets based on control path decisions). In this example, and as will be explained in greater detail below, the control plane may operate as a software-driven controller situated outside the network switches and/or software components distributed across the network switches. Examples of software-defined networks may include CISCO INSIEME and VMWARE NSX.

Detection module 104 may detect the denial-of-service attack in any suitable manner. For example, detection module 104 may detect the denial-of-service attack by receiving a message from a security system that has identified the denial-of-service attack. For example, detection module 104 may receive a notification from a perimeter firewall of the denial-of-service attack. Additionally or alternatively, detection module 104 may detect the denial-of-service attack by monitoring incoming traffic to the computing network. In some examples, detection module 104 may detect the denial-of-service attack by identifying the poor performance and/or the failure of one or more computing resources on the computing network.

Figure 4:
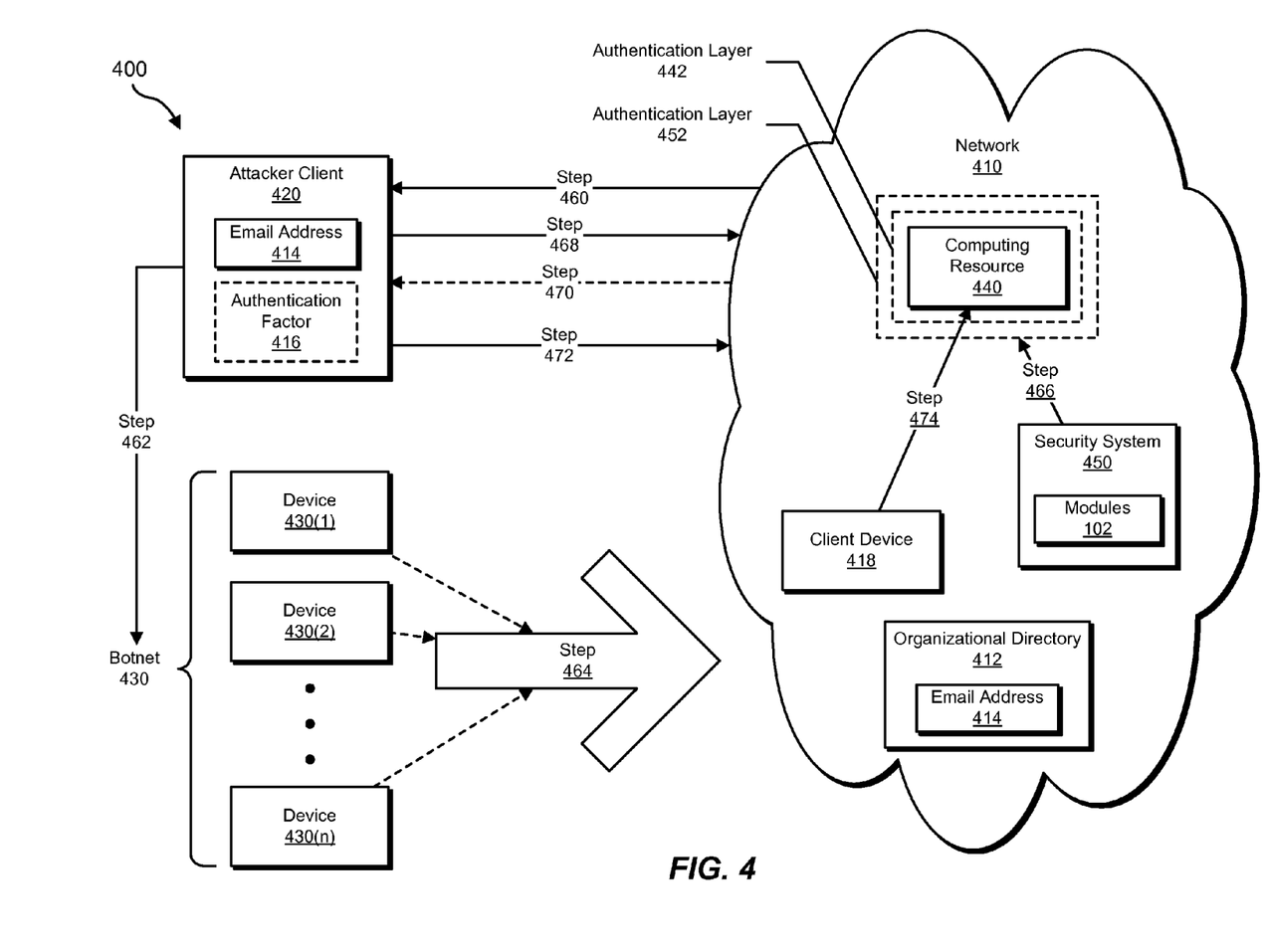
FIG. 4 is a block diagram of an exemplary system for blocking flanking attacks on computing systems.

As an example of detecting a denial-of-service attack, FIG. 4 illustrates an exemplary system 400. As shown in FIG. 4, system 400 may include a network 410, an attacker client 420, and a botnet 430 with devices 430(1)-(n). In one example, an attacker may wish to access a computing resource 440 protected by an authentication layer 442. Accordingly, at step 460, the attacker may retrieve an email address 414 from an organizational directory 412 that the attacker may use in a targeted attack on network 410 to access computing resource 440. At step 462, the attacker may broadcast an instruction to botnet 430 to initiate a distributed denial-of-service attack on network 410. Accordingly, at step 464, devices 430(1)-(n) may flood network 410 with requests (e.g., to engage and/or distract system administration personnel and/or resources).

Returning to FIG. 3, at step 304 one or more of the systems described herein may infer, based at least in part on detecting the denial-of-service attack, a secondary attack targeting at least one computing resource within the computing network. For example, at step 304 inference module 106 may, as part of computing device 202 in FIG. 2, infer, based at least in part on detecting denial-of-service attack 210, a secondary attack 212 targeting at least one computing resource (e.g., computing resource 206) within the computing network 204.

As used herein, the phrase "computing resource" may refer to any computing device, computing service, and/or computer-readable data that may be accessed over a network. In some examples, as will be explained in greater detail below, the computing resource may include a sensitive resource. For example, the computing resource may include and/or provide access to sensitive data (e.g., personal customer data, credit card data, defense and/or national security information, confidential documents, intellectual property, etc.). In some examples, the computing resource may include an application and/or a server that accesses sensitive data. Additionally or alternatively, the computing resource may include a database and/or a storage system that stores sensitive data. In one example, access to the computing resource may be regulated by an authentication system requiring an authentication factor (e.g., a password).

The secondary attack may include any attack that facilitates access to the computing resource for an attacker. For example, the secondary attack may include a targeted attack designed to acquire an authentication factor for accessing the computing resource and/or acquire control over a computing system that has access to the computing resource (e.g., due to an authentication factor controlled by the computing system). In some examples, the secondary attack may include a spear phishing attack. For example, the secondary attack may include a malicious document (such as a malicious Portable Document Format (PDF) document or a MICROSOFT OFFICE document), which may be sent as an email attachment to an unsuspecting user (e.g., with access to the computing resource via the authentication factor), and which may exploit a zero-day-vulnerability in a document-handling application on the user's computer. Additionally or alternatively, in some examples, the secondary attack may include an attempt to exploit a previously-established infiltration of the computing network and/or a previous acquisition of and/or control over an authentication factor for accessing the computing resource. For example, the secondary attack may include a use of an illegitimately acquired authentication factor and/or copying sensitive data from the computing resource.

Inference module 106 may infer the secondary attack targeting the computing resource in any suitable manner. For example, inference module 106 may infer the secondary attack targeting the computing resource by linking the denial-of-service attack to a computing system, a computing module, and/or one or more computing instructions that respond to attacks such as the secondary attack. For example, inference module 106 may call a security subroutine and/or communicate an instruction to a security system in response to having identified the denial-of-service attack. In one examples, inference module 106 may infer the secondary attack targeting the computing resource based on the computing resource residing within the computing network. In some examples, inference module 106 may infer the secondary attack targeting the computing resource by determining that the computing resource is sensitive. As used herein, the term "sensitive," as it applies to computing resources, may refer to any computing resource which an organization may have a heightened interest to protect against attacks. For example, sensitive computing resources may include computing resources associated with private data, confidential data, valuable data, data typically targeted during attacks, and/or data typically acquired and/or used for illicit activities. As will be explained in greater detail below, in some examples the systems described herein may determine that the computing resource is subject to additional protection in response to determining that the computing resource is sensitive.

Inference module 106 may determine that the computing resource is sensitive in any of a variety of ways. For example, inference module 106 may determine that the computing resource is sensitive by identifying a classification by a data loss prevention system indicating that data corresponding to the computing resource is sensitive. For example, the data loss prevention system may analyze data corresponding to the computing resource and inference module 106 may receive the classification from the data loss prevention system. Additionally or alternatively, inference module 106 may operate as a part of the data loss prevention system. For example, the computing resource may include (or provide access to) a collection of documents. In this example, a data loss prevention system may monitor, scan, analyze, and/or parse the collection of documents and classify one or more of the documents as sensitive (e.g., subject to a rule and/or restriction of the data loss prevention system) based on one or more keywords and/or regular expressions found within the documents. Accordingly, inference module 106 may identify the classification of the documents performed by the data loss prevention system and classify the computing resource as sensitive due to the association between the computing resource and the documents. In some examples, inference module 106 may distinguish between different data loss prevention classifications. For example, a data loss prevention system may identify and track both credit card information and medical information, both of which the data loss prevention system may treat as sensitive data. However, inference module 106 may treat the credit card information as sensitive without treating the medical information as sensitive (e.g., because the credit card information may be more likely to be a target of a potential secondary attack).

In addition to or as an alternative to receiving information about data associated with the computing resource from a data loss prevention system, inference module 106 may analyze the data directly (e.g., searching for keywords and/or regular expressions within a collection of documents stored within and/or accessible by the computing resource) to determine that the documents are sensitive and that, therefore, the computing resource is sensitive.

In some examples, inference module 106 may determine the computing resource is sensitive by identifying a classification of the computing resource based on user activity in connection with the computing resource and determining that the classification of the computing resource represents a sensitive type of computing resource. For example, inference module 106 may determine that data within and/or accessible to the computing resource is sensitive because it is only accessed by and/or accessible to a select group of users within an organization (e.g., users with sensitive roles within the organization). In one example, inference module 106 may determine that the computing resource is frequently accessed by a vice president of the financial department of an organization but is rarely accessed by other high-level executives and is never accessed by members of the organization lower in the organizational hierarchy. In this example, based on the access patterns of the various members of the organization and in light of their respective roles, inference module 106 may determine that the computing resource is sensitive. In some examples, inference module 106 may identify the classification of the computing resource based on user activity by interfacing with a system for the governance of unstructured data. For example, inference module 106 may interface with SYMANTEC DATA INSIGHT and/or VARONIS DATADVANTAGE to identify sensitive data and/or user access patterns to data.

In some examples, inference module 106 may determine that the computing resource is sensitive by determining that the computing resource has been tagged as sensitive. For example, an administrator of the computing network may tag one or more servers, databases, and/or applications as sensitive.

Using FIG. 4 as an example, inference module 106 may as a part of a security system 450, infer a secondary attack on computing resource 440 based on detecting the denial-of-service attack launched by botnet 430 in step 464.

Returning to FIG. 3, at step 306 one or more of the systems described herein may determine that the computing resource is subject to additional protection based on inferring the secondary attack targeting the computing resource. For example, at step 306 determination module 108 may, as part of computing device 202 in FIG. 2, determine that computing resource 206 is subject to additional protection based on inferring secondary attack 212 targeting the computing resource.

Determination module 108 may determine that the computing resource is subject to additional protection based on inferring the secondary attack in any suitable manner. For example, as mentioned earlier, in some examples the systems described herein may determine that the computing resource is sensitive. Accordingly, determination module 108 may determine that the computing resource is subject to additional protection in response to determining that the computing resource is sensitive. In some examples, determination module 108 may determine that the computing resource is subject to additional protection based at least in part on the computing resource requiring an authentication factor to access (e.g., because the secondary attack may be used to acquire or undermine the authentication factor, leaving the computing resource exposed).

Returning to FIG. 3, at step 308 one or more of the systems described herein may protect the computing resource against the secondary attack by adding an authentication requirement for accessing the computing resource. For example, at step 308 protection module 110 may, as part of computing device 202 in FIG. 2, protect computing resource 206 against secondary attack 212 by adding an authentication requirement 214 for accessing computing resource 206.

Protection module 110 may add the authentication requirement for accessing the computing resource in any suitable manner. For example, as mentioned earlier, the computing network may include a software-defined network. In this example, protection module 110 may add the authentication requirement for accessing the computing resource by modifying the software-defined network to interpose an authentication system that implements the authentication requirement between the computing resource and at least a portion of the computing network. For example, protection module 110 may modify the software-defined network at the control plane to redirect one or more routing paths to the computing resource through a gateway that includes the authentication system that implements the authentication requirement.

In some examples, access to the computing resource may already require a first authentication factor. In these examples, adding the authentication requirement for accessing the computing resource may entail adding a second authentication factor to accompany the first authentication factor that is already in place for accessing the computing resource. In this manner, protection module 110 may protect computing resource by adding the second authentication factor in case the first authentication factor is compromised (e.g., by the secondary attack). In some examples, the first authentication factor may be stored within the computing network (e.g., such that the secondary attack could give an attacker access to the first authentication factor) while the second authentication factor may not be stored within the computing network (e.g., may be issued out-of-band).

Figure 5:
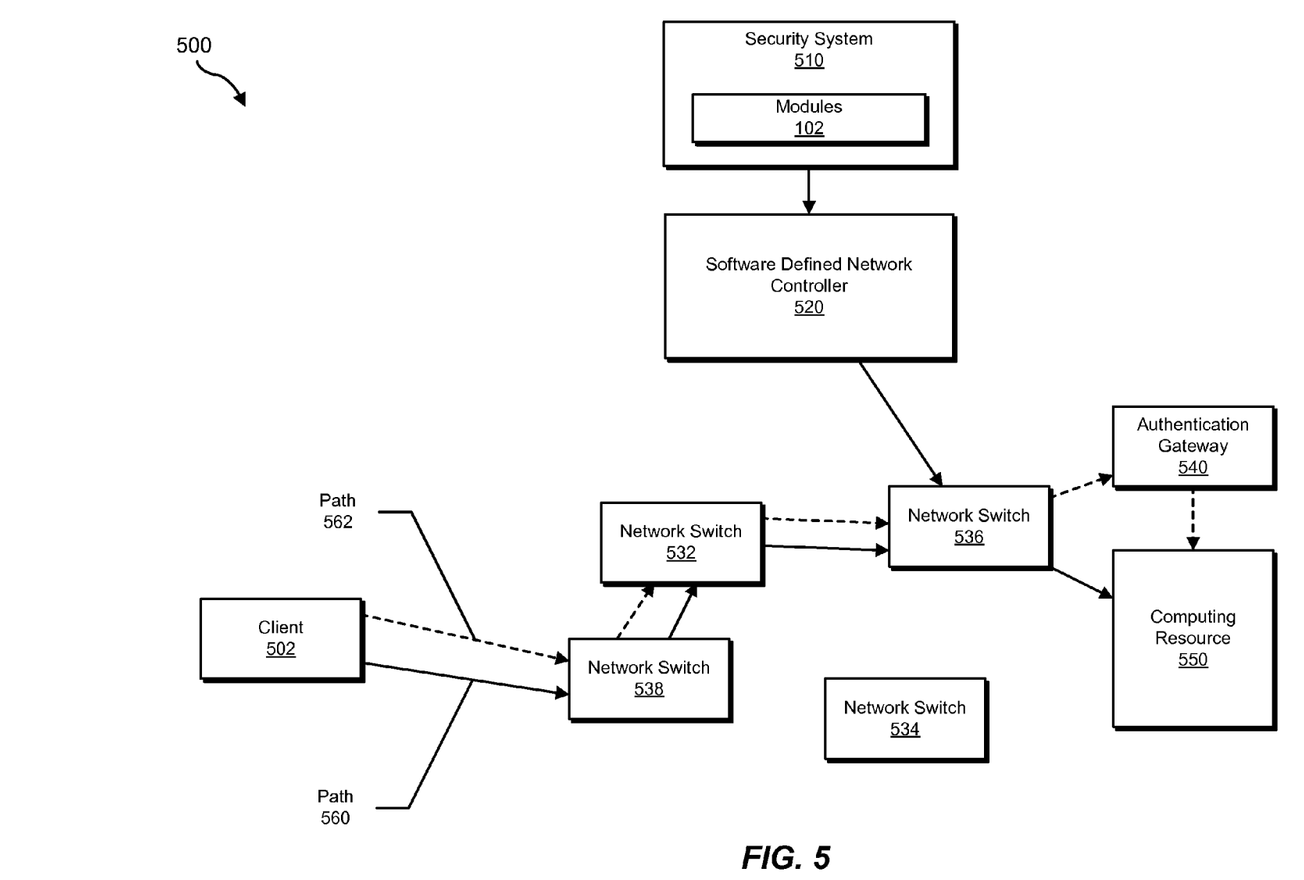
FIG. 5 is a block diagram of an exemplary system for blocking flanking attacks on computing systems.

As an example of protection module 110 adding the authentication requirement via a software-defined network, FIG. 5 is a block diagram of an exemplary computing system 500 for blocking flanking attacks on computing systems. As shown in FIG. 5, exemplary system 500 may include a client 502 that may attempt to access a computing resource 550 via a software-defined network that includes network switches 532, 534, 536, and 538. In one example, a security system 510 (e.g., including one or more of modules 102) may infer an attack on computing resource 550 and/or determine that computing resource 550 is subject to additional protection in response to a denial-of-service attack. Accordingly, protection module 110 may send an instruction to software defined network controller 520 to reconfigure the software-defined network by, e.g., adding a flow rule to the software-defined network to direct traffic to computing resource 550 through an authentication gateway 540. Based on the flow rule, software defined network controller 520 and/or network switch 536 may modify the forwarding table of network switch 536 to forward traffic destined for computing resource 550 to authentication gateway 540. In this manner, protection module 110 may change a path 560 from client 502 to computing resource 550 through the software-defined network to a path 562.

In some examples, one or more of the systems described herein (e.g., protection module 110) may determine that the secondary attack is not targeting the computing resource (e.g., that the secondary attack has passed and/or that the secondary attack has been neutralized). In these examples, protection module 110 may remove the authentication requirement in response to determining that the secondary attack is not targeting the computing resource. Additionally or alternatively, protection module 110 may remove the authentication requirement once the denial-of-service attack is concluded (and, e.g., system administrators are therefore no longer distracted and/or occupied). For example, protection module 110 may reconfigure a software-defined network to cause network paths that had previously led to the computing resource via the authentication gateway to lead directly to the computing resource without passing through the authentication gateway.

FIG. 4 may provide an example of protection module 110 protecting a computing resource against a secondary attack by adding an authentication requirement for accessing the computing resource. As explained earlier, in one example, an attacker may wish to access computing resource 440 protected by authentication layer 442. Accordingly, at step 460, the attacker may retrieve email address 414 from organizational directory 412 for subsequent use in a targeted attack on network 410 to access computing resource 440. At step 462, the attacker may broadcast an instruction to botnet 430 to initiate a distributed denial-of-service attack on network 410. Accordingly, at step 464, devices 430(1)-(n) may flood network 410 with requests (e.g., to engage and/or distract system administration personnel and/or resources). Security system 450 may then observe the distributed denial-of-service attack on network 410 and infer a secondary attack on computing resource 440 (e.g., based on sensitive data stored by computing resource 440, based on computing resource 440 employing authentication layer 442, and/or based on computing resource 440 having previously been tagged as sensitive). Accordingly, at step 466 security system 450 may temporarily provision computing resource 440 with an authentication layer 452 (thereby temporarily implementing two-factor authentication for computing resource 440). At step 468, attacker client 420 may launch a spear phishing attack on network 410. For example, attacker client 420 may send an email with a malicious attachment to email address 414. The malicious attachment may leverage a zero-day exploit to infect and/or gain control over a device within network 410. Accordingly, at step 470, attacker client 420 may gain control of an authentication factor 416 that satisfies authentication layer 442 and would therefore normally grant access to computing resource 440. At step 472, attacker client 420 may attempt to access computing resource 440. However, authentication layer 452 may require a second authentication factor for accessing computing resource 440, leaving authentication factor 416 alone insufficient to access computing resource 440. Accordingly, attacker client 420 may fail to access computing resource 440. At step 474, an authorized user of network 410 may attempt to access computing resource 440 from client device 418. The user may have been issued a second authentication factor to satisfy authentication layer 452 (e.g., previously or in response to identifying the denial-of-service attack). Accordingly, the legitimate attempt to access computing resource 440 may be successful.

As explained above, by responding to denial-of-service attacks on a network with temporarily increased authentication requirements for accessing sensitive network resources, the systems and methods described herein may prevent decoy denial-of-service attacks from increasing the likelihood of success of targeted attacks on the network. Additionally, by deploying the increased authentication requirements through modifying software-defined networks, these systems and methods may quickly and automatically protect against flanking attacks. For example, by quickly deploying a second authentication factor in response to denial-of-service attacks to protect against secondary targeted attacks and removing the second authentication factor when the threat of a secondary targeted attack has passed, these systems and methods may increase computing network security when it is needed most while minimizing inconvenience to users.

In one example, a perimeter firewall may detect a distributed denial-of-service attack on a network. A threat response broker may, in response, automatically provision an authentication gateway in front of critical servers using a software-defined-network manager. In this case, if an endpoint is compromised using a spear-phishing attack, then the stolen single-factor credential may be insufficient to breach critical internal servers. The end user may be prompted for a second factor. Once the threat profile has lowered, the threat response broker may dynamically deprovision the two-factor authentication network gateways through the software-defined network. This may limit the inconvenience imposed due to two-factor authentication for the duration of the threat.

Figure 6:
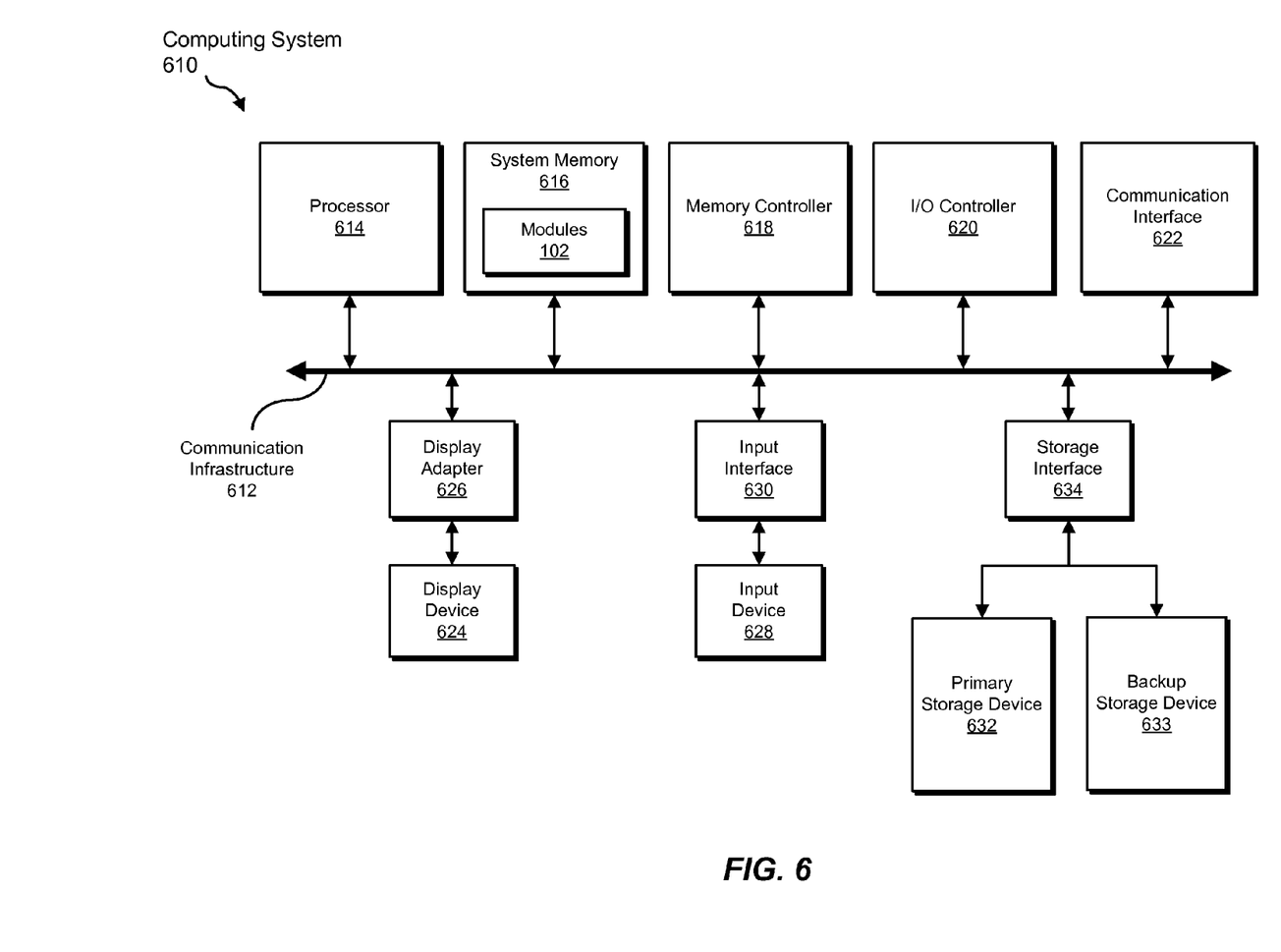
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
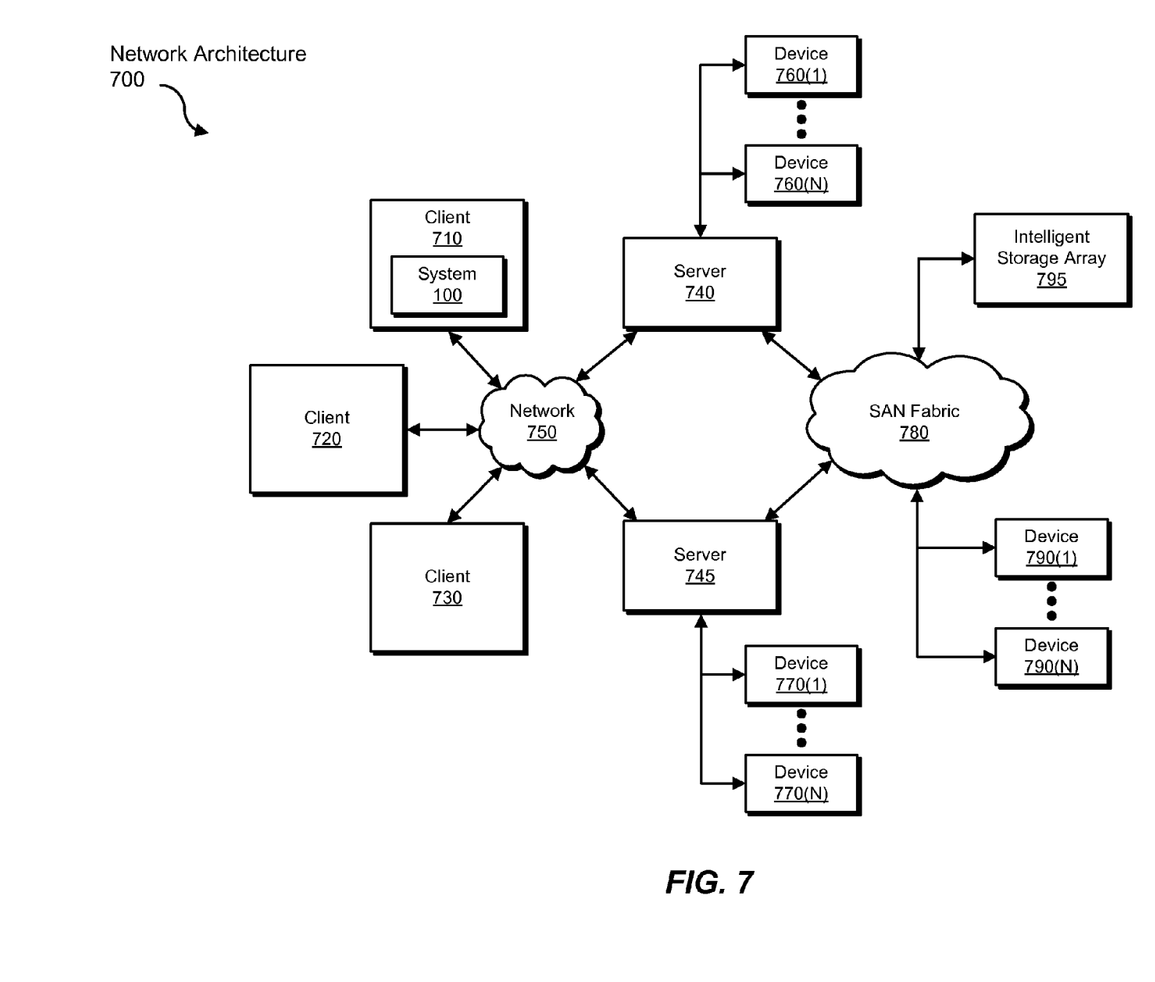
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for blocking flanking attacks on computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a denial-of-service attack notification to be transformed, transform the notification into a determination to deploy authentication requirements for computing resources, output a result of the transformation to a software-defined network, use the result of the transformation to set up an authentication gateway, and store the result of the transformation to forwarding tables in network switches. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for blocking flanking attacks on computing systems, at least a portion of the method being performed by a computing device comprising at least one processor, the method comprising:

detecting a denial-of-service attack targeting a computing network that comprises a software-defined network;

inferring, based at least in part on detecting the denial-of-service attack, a secondary attack targeting at least one computing resource within the computing network;

determining that the computing resource is sensitive;

determining that the computing resource is subject to additional protection based on inferring the secondary attack targeting the computing resource and based on determining that the computing resource is sensitive;

protecting the computing resource against the secondary attack by adding an authentication requirement for accessing the computing resource, wherein adding the authentication requirement comprises modifying the software-defined network to interpose an authentication system that implements the authentication requirement between the computing resource and at least a portion of the computing network;

determining that the secondary attack is not targeting the computing resource;

removing the authentication requirement in response to determining that the secondary attack is not targeting the computing resource.

2. The computer-implemented method of claim 1, wherein determining that the computing resource is sensitive comprises:
identifying, by a data loss prevention system, a classification of data corresponding to the computing resource;
determining that the classification of data indicates that the data corresponding to the computing resource includes a sensitive type of data.

3. The computer-implemented method of claim 1, wherein determining that the computing resource is sensitive comprises:
identifying a classification of the computing resource based on user activity in connection with the computing resource;
determining that the classification of the computing resource indicates that the computing resource comprises a sensitive type of computing resource.

4. The computer-implemented method of claim 1, wherein determining that the computing resource is sensitive comprises determining that the computing resource has been tagged as sensitive.

5. The computer-implemented method of claim 1, wherein adding the authentication requirement for accessing the computing resource comprises adding a second authentication factor to accompany a first authentication factor that is already in place for accessing the computing resource.

6. The computer-implemented method of claim 1, wherein inferring the secondary attack based at least in part on detecting the denial-of-service attack comprises inferring a spear phishing attack that attempts to collect an authentication factor used by at least one user of the computing network for accessing the computing resource.

7. A system for blocking flanking attacks on computing systems, the system comprising:
a detection module, stored in memory, that detects a denial-of-service attack targeting a computing network that comprises a software-defined network;
an inference module, stored in memory, that infers, based at least in part on detecting the denial-of-service attack, a secondary attack targeting at least one computing resource within the computing network;
a determination module, stored in memory, that:
determines that the computing resource is sensitive;
determines that the computing resource is subject to additional protection based on inferring the secondary attack targeting the computing resource and based on determining that the computing resource is sensitive;
a protection module, stored in memory, that:
protects the computing resource against the secondary attack by adding an authentication requirement for accessing the computing resource, wherein adding the authentication requirement comprises modifying the software-defined network to interpose an authentication system that implements the authentication requirement between the computing resource and at least a portion of the computing network;
determines that the secondary attack is not targeting the computing resource;
removes the authentication requirement in response to determining that the secondary attack is not targeting the computing resource;
at least one physical processor that executes the detection module, the inference module, the determination module, and the protection module.

8. The system of claim 7, wherein the inference module determines that the computing resource is sensitive by:
identifying, by a data loss prevention system, a classification of data corresponding to the computing resource;
determining that the classification of data indicates that the data corresponding to the computing resource includes a sensitive type of data.

9. The system of claim 7, wherein the inference module determines that the computing resource is sensitive by:
identifying a classification of the computing resource based on user activity in connection with the computing resource;
determining that the classification of the computing resource indicates that the computing resource comprises a sensitive type of computing resource.

10. The system of claim 7, wherein the inference module determines that the computing resource is sensitive by determining that the computing resource has been tagged as sensitive.

11. The system of claim 7, wherein the adding module adds the authentication requirement for accessing the computing resource by adding a second authentication factor to accompany a first authentication factor that is already in place for accessing the computing resource.

12. The system of claim 7, wherein the inference module infers the secondary attack based at least in part on detecting the denial-of-service attack by inferring a spear phishing attack that attempts to collect an authentication factor used by at least one user of the computing network for accessing the computing resource.

13. A non-transitory computer-readable medium comprising one or more computer-readable instructions that, when executed by at least one processor of a computing device, cause the computing device to:
detect a denial-of-service attack targeting a computing network that comprises a software-defined network;
infer, based at least in part on detecting the denial-of-service attack, a secondary attack targeting at least one computing resource within the computing network;
determine that the computing resource is sensitive;
determine that the computing resource is subject to additional protection based on inferring the secondary attack targeting the computing resource and based on determining that the computing resource is sensitive;
protect the computing resource against the secondary attack by adding an authentication requirement for accessing the computing resource, wherein adding the authentication requirement comprises modifying the software-defined network to interpose an authentication system that implements the authentication requirement between the computing resource and at least a portion of the computing network;
determine that the secondary attack is not targeting the computing resource;

remove the authentication requirement in response to determining that the secondary attack is not targeting the computing resource.

14. The non-transitory computer-readable medium of claim 13, wherein determining that the computing resource is sensitive comprises:
identifying, by a data loss prevention system, a classification of data corresponding to the computing resource;
determining that the classification of data indicates that the data corresponding to the computing resource includes a sensitive type of data.

15. The non-transitory computer-readable medium of claim 13, wherein determining that the computing resource is sensitive comprises:
identifying a classification of the computing resource based on user activity in connection with the computing resource;
determining that the classification of the computing resource indicates that the computing resource comprises a sensitive type of computing resource.

* * * * *